US010394246B2

(12) United States Patent
Moshkina-Martinson et al.

(10) Patent No.: US 10,394,246 B2
(45) Date of Patent: Aug. 27, 2019

(54) ROBOT WITH AUTOMATIC STYLES

(71) Applicant: Neato Robotics, Inc., Newark, CA (US)

(72) Inventors: Lilia Moshkina-Martinson, Newark, CA (US); Kristen Holtz, Newark, CA (US)

(73) Assignee: Neato Robotics, Inc., Newark, CA (US)

( * ) Notice: Subject to any disclaimer, the term of this patent is extended or adjusted under 35 U.S.C. 154(b) by 315 days.

(21) Appl. No.: 15/475,983

(22) Filed: Mar. 31, 2017

(65) Prior Publication Data

US 2018/0284786 A1    Oct. 4, 2018

(51) Int. Cl.
*G05D 1/02*    (2006.01)
*A47L 9/28*    (2006.01)

(52) U.S. Cl.
CPC ............ *G05D 1/024* (2013.01); *A47L 9/2826* (2013.01); *A47L 9/2831* (2013.01); *A47L 9/2847* (2013.01); *A47L 9/2852* (2013.01); *A47L 9/2857* (2013.01); *A47L 9/2894* (2013.01); *G05D 1/0217* (2013.01); *G05D 1/0219* (2013.01); *G05D 1/0274* (2013.01); *A47L 2201/04* (2013.01); *A47L 2201/06* (2013.01); *G05D 2201/0215* (2013.01)

(58) Field of Classification Search
CPC ............ A47L 2201/04; A47L 2201/06; G05D 1/0219; G05D 2201/0215
See application file for complete search history.

(56) References Cited

U.S. PATENT DOCUMENTS 6,690,134 B1 *    2/2004  Jones ....................... A47L 9/009
                                                            318/567
8,855,914 B1    10/2014  Alexander et al.
(Continued)

OTHER PUBLICATIONS

Vaussard, Fink, Bauwens, Retornaz, Hamel, Dillenbourg and Mondada, "Lessons Learned from Robotic Vacuum Cleaners Entering in the Home Ecosystem", in Advances in Autonomous Robotics, Mar. 2014.
(Continued)

*Primary Examiner* — Ryan Rink
(74) *Attorney, Agent, or Firm* — Kilpatrick Townsend & Stockton LLP

(57) ABSTRACT

Embodiments provide a plurality of personalized, user selectable styles. Each style is determined by a combination of dimensions. Each style, except the default balanced style, prioritizes one of the dimensions over the other cleaning dimensions. In one embodiment, the styles are cleaning styles and the cleaning dimensions are cleaning time, coverage and obstacle avoidance. The cleaning styles are gentle, fast, thorough and balanced. The gentle style protects expensive furniture, with obstacle avoidance prioritized over cleaning time and coverage. The fast style cleans quickly, prioritizing cleaning time over coverage and obstacle avoidance. The thorough style prioritizes coverage over cleaning time and obstacle avoidance. The balanced style prioritizes all three cleaning dimensions substantially the same. The prioritization is achieved through adjustments to the autonomous robot navigation. User selection of a style can be achieved directly or automatically based on various mechanisms, such as user history.

17 Claims, 7 Drawing Sheets

(56) References Cited

U.S. PATENT DOCUMENTS

| | | |
|---|---|---|
| 8,903,589 B2 | 12/2014 | Sofman et al. |
| 8,996,172 B2 | 3/2015 | Shah et al. |
| 2005/0171636 A1 | 8/2005 | Tani |
| 2007/0285041 A1* | 12/2007 | Jones .................. G05D 1/0219 318/568.12 |
| 2008/0091305 A1 | 4/2008 | Svendsen et al. |
| 2010/0063628 A1* | 3/2010 | Landry ................ G05D 1/0272 700/258 |
| 2011/0202175 A1* | 8/2011 | Romanov ........... A47L 11/4011 700/250 |
| 2012/0125363 A1 | 5/2012 | Kim et al. |
| 2013/0146090 A1 | 6/2013 | Ko |
| 2014/0207280 A1* | 7/2014 | Duffley ................ G05D 1/0016 700/257 |
| 2014/0207282 A1 | 7/2014 | Angle et al. |
| 2016/0270619 A1 | 9/2016 | Lu et al. |
| 2016/0306358 A1* | 10/2016 | Kang ................... G05D 1/0214 |
| 2017/0049288 A1* | 2/2017 | Knutson ............. A47L 11/4011 |
| 2017/0332869 A1* | 11/2017 | Nam ....................... A47L 11/33 |
| 2018/0178391 A1* | 6/2018 | Naito .................. G05D 1/0291 |
| 2018/0325252 A1* | 11/2018 | Hopke ................... A46B 9/028 |
| 2018/0344116 A1* | 12/2018 | Schriesheim ......... A47L 9/2857 |
| 2018/0353042 A1* | 12/2018 | Gil ....................... G05D 1/0088 |
| 2018/0361581 A1* | 12/2018 | Williams ............... B25J 9/1664 |

OTHER PUBLICATIONS

Arkin, R.C. & Balch, T., "AuRA: Principles and Practice in Review", Journal of Experimental and Theoretical Artificial Intelligence, 1997.

* cited by examiner

ROBOT WITH AUTOMATIC STYLES

BACKGROUND OF THE INVENTION

The present invention relates to robots with different modes, and in particular to cleaning robots with different cleaning modes. Various types of cleaning modes have been described in the art.

People in general, and users of robot vacuum cleaners in particular, have distinct cleaning styles and ideas of what is and what is not acceptable in a robot vacuum cleaner. For example, a meta-study of user perceptions of robot vacuum cleaners, (Vaussard et al, 2014) identified four different user styles according to their cleaning habits: Spartan, Minimalist, Caring, and Manic. Each of these types is characterized by distinct preferences.

US Pub. 20140207282 describes a possibility for a user of vacuum cleaners or other cleaning apparatus to select simultaneously from a number of goals, namely: "quick", "deep" "spot" and "edges and corners." These goals map onto a small set of discrete actions, such as "single pass" for "quick" goal, and "double pass" for "deep" goal, and "following the perimeter of obstacles or not" for "edges and corners". Sliders are shown for each goal, with the sliders optionally linked (e.g., a high "quick cleaning" setting causes a low "deep cleaning" setting. US Pub. No. 20140207280 describes remote user control of primary and alternative cleaning strategies.

US Pub. 20050171636 describes a normal-cleaning mode, a careful-cleaning mode to clean a room carefully, a spot-cleaning mode to clean only a central region of a room, and a no-cleaning mode to skip cleaning of a room.

US Pub. 20120125363 describes changing mode depending on the type of floor. US Pub. 20160270619 describes a cleaning robot with a removable pad. The robot changes cleaning mode depending on the type of pad attached. US Pub. 20130146090 describes a power saving cleaning mode. US Pub. 20080091305 describes different cleaning speeds.

It would be desirable to have user controls that are simple and aligned with typical user goals.

BRIEF SUMMARY OF THE INVENTION

Embodiments provide a plurality of personalized, user selectable robot styles. Each style is determined by a combination of dimensions. Each style, except a default balanced style, prioritizes one of the dimensions over the other dimensions.

In one embodiment, the styles are cleaning styles and the dimensions relate to cleaning. However, other robot operations besides cleaning can use the different styles of the invention. For example, a robot can provide environmental mapping (WiFi coverage, air quality, etc.) using a fast style where precise accuracy isn't needed, a thorough style where precise accuracy in every area is desired, or a gentle style to avoid collisions with objects.

In one embodiment for cleaning styles, the cleaning dimensions are cleaning time, coverage and obstacle avoidance. The cleaning styles are gentle, fast, thorough and balanced. The gentle style protects expensive furniture, with obstacle avoidance prioritized over cleaning time and coverage. The fast style cleans quickly, prioritizing cleaning time over coverage and obstacle avoidance. The thorough style prioritizes coverage over cleaning time and obstacle avoidance. The balanced style prioritizes all three cleaning dimensions substantially the same. The prioritization is achieved through adjustments to the autonomous robot navigation.

In one embodiment, these styles fuse continuous navigation actions in a behavior-based manner, providing a method for strategically changing the way the robot navigates in an environment based on sensor data. The targeted areas of autonomous navigation include, but are not limited to: path planning, obstacle avoidance, goal selection, coverage, etc.

These distinct styles can be selected and further tuned or personalized based on specific user/environment needs within the navigational adjustment categories. Such selection can be achieved through: 1) direct selection by the user of a certain style, 2) automatic selection by the robot based on initial input from the user via questionnaires, surveys, etc., 3) automatic selection and tuning based on the cleaning history of a particular environment, 4) automatic selection learned from the history of user selections.

The dimensions are not fully independent, and maximizing one will typically result in detractions to the others. For example, Coverage by definition implies getting as close to the obstacles as possible, even touching them to achieve maximum possible coverage, whereas Obstacle Avoidance refers to its opposite—staying away from them to avoid collision at all costs. Similarly, maximizing Coverage would result in longer Cleaning Time, and vice versa, shorter cleaning times are likely to come at the expense of either coverage or obstacle avoidance. While it is possible to achieve a certain balance between these three dimensions, it would not provide an optimal fit to user needs, desires and their environments. These dimensions present a framework within which both creation of new styles and tuning of the existing styles is possible.

DETAILED DESCRIPTION OF THE INVENTION

Overall Architecture

Figure 1:
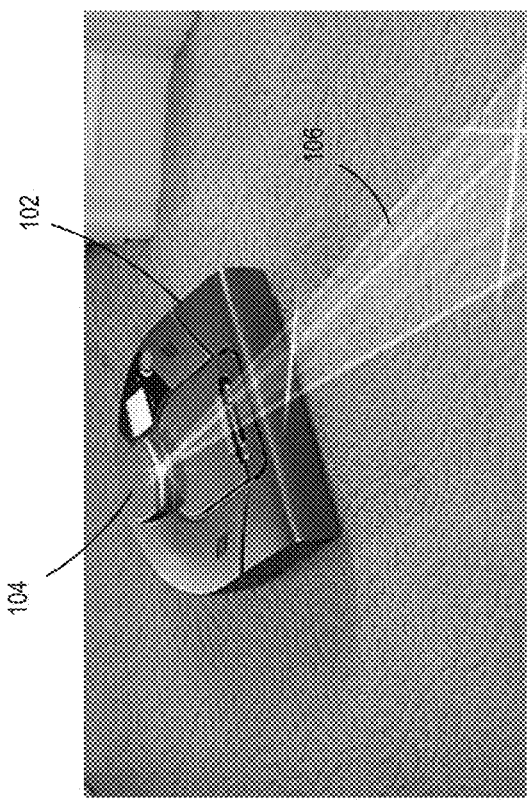
FIG. 1 is a diagram of a cleaning robot with a LIDAR turret according to an embodiment.

FIG. 1 is a diagram of a cleaning robot with a LIDAR turret according to an embodiment. A cleaning robot 102 has a LIDAR (Light Detection and Ranging) turret 104 which emits a rotating laser beam 106. Detected reflections of the laser beam off objects are used to calculate both the distance to objects and the location of the cleaning robot. One embodiment of the distance calculation is set forth in U.S. Pat. No. 8,996,172, "Distance sensor system and method," the disclosure of which is incorporated herein by reference. The collected data is also used to create a map, using a SLAM (Simultaneous Location and Mapping) algorithm. One embodiment of a SLAM algorithm is described in U.S. Pat. No. 8,903,589, "Method and apparatus for simultaneous localization and mapping of mobile robot environment," the disclosure of which is incorporated herein by reference.

Figure 2:
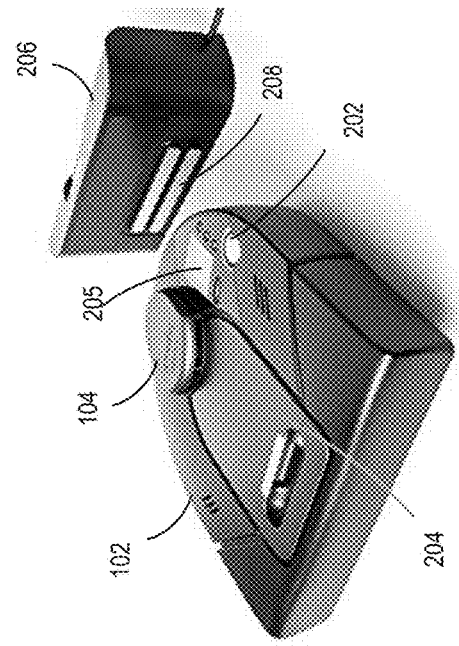
FIG. 2 is a diagram of a cleaning robot and charging station according to an embodiment.

FIG. 2 is a diagram of a cleaning robot and charging station according to an embodiment. Cleaning robot 102 with turret 10 is shown. Also shown is a cover 204 which can be opened to access a dirt collection bag and the top side of a brush. Buttons 202 allow basic operations of the robot cleaner, such as starting a cleaning operation. A display 205 provides information to the user. Cleaning robot 102 can dock with a charging station 206, and receive electricity through charging contacts 208.

Figure 3:
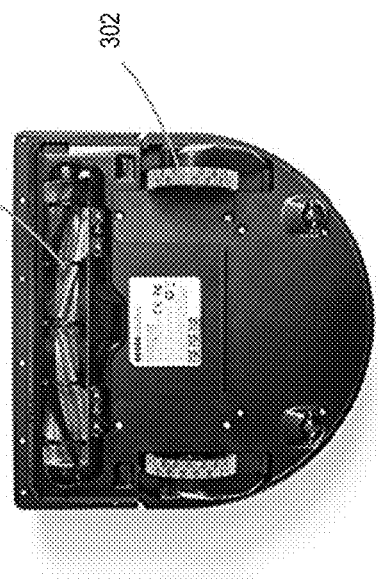
FIG. 3 is a diagram of the underside of a cleaning robot according to an embodiment.

FIG. 3 is a diagram of the underside of a cleaning robot according to an embodiment. Wheels 302 move the cleaning robot, and a brush 304 helps free dirt to be vacuumed into the dirt bag.

Figure 4:
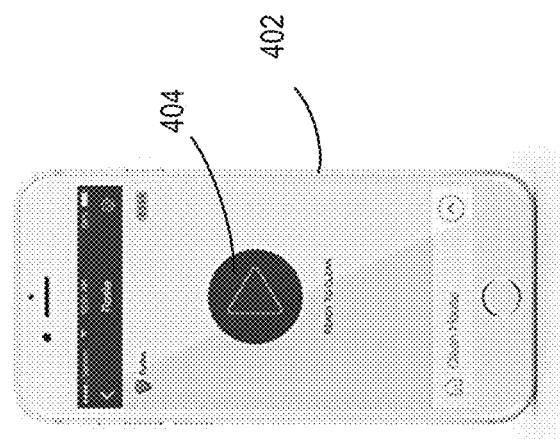
FIG. 4 is a diagram of a smartphone control application display for a cleaning robot according to an embodiment.

FIG. 4 is a diagram of a smartphone control application display for a cleaning robot according to an embodiment. A smartphone 402 has an application that is downloaded to control the cleaning robot. An easy to use interface has a start button 404 to initiate cleaning.

Figure 5:
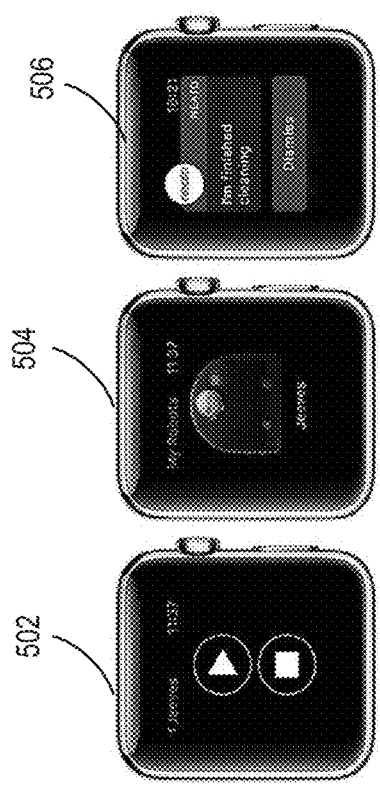
FIG. 5 is a diagram of a smart watch control application display for a cleaning robot according to an embodiment.

FIG. 5 is a diagram of a smart watch control application display for a cleaning robot according to an embodiment. Example displays are shown. A display 502 provides and easy to use start button. A display 504 provides the ability to control multiple cleaning robots. A display 506 provides feedback to the user, such as a message that the cleaning robot has finished.

Figure 6:
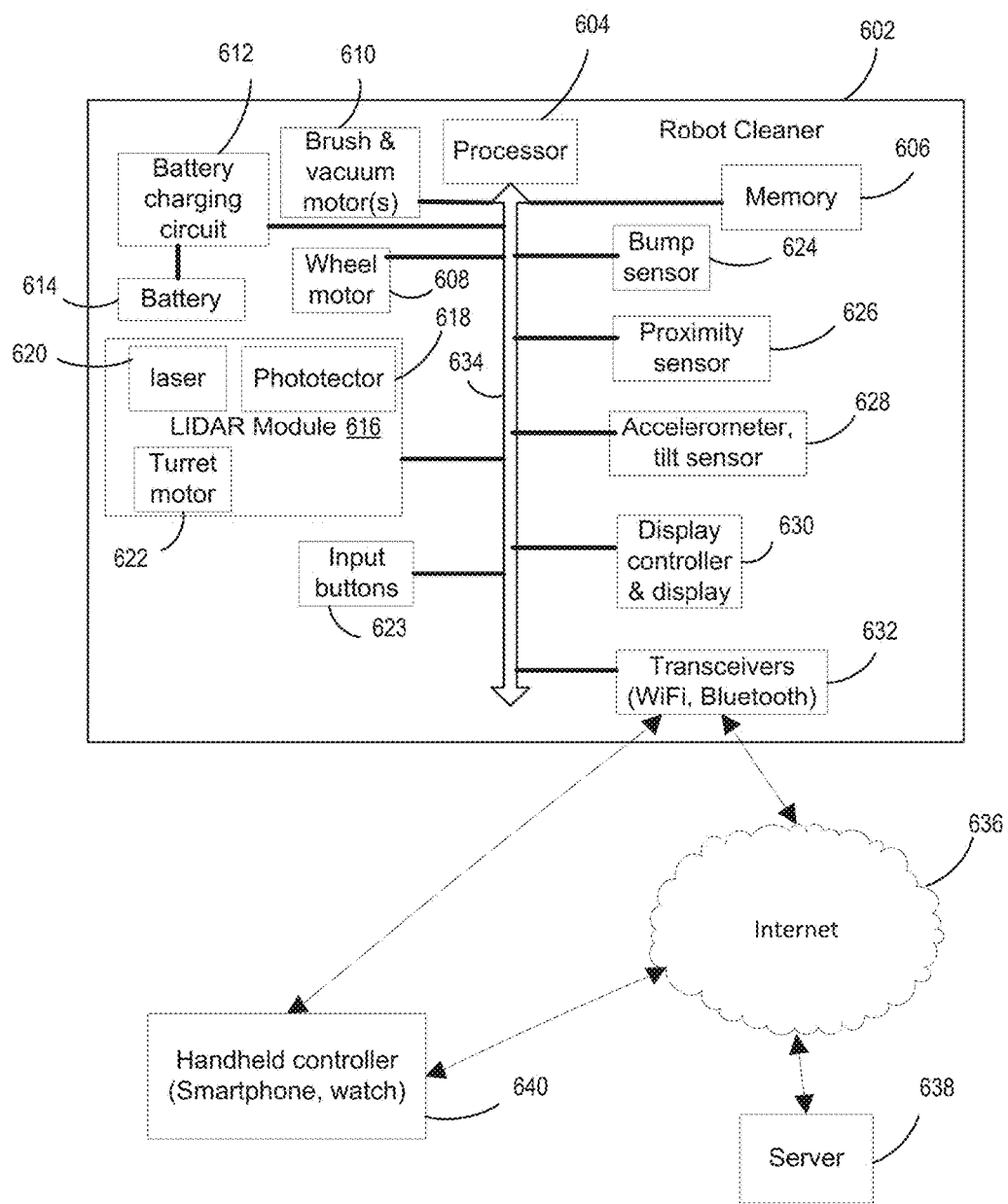
FIG. 6 is a diagram of a the electronic system for a cleaning robot according to an embodiment.

FIG. 6 is a high level diagram of a the electronic system for a cleaning robot according to an embodiment. A cleaning robot 602 includes a processor 604 that operates a program downloaded to memory 606. The processor communicates with other components using a bus 634 or other electrical connections. In a cleaning mode, wheel motors 608 control the wheels independently to move and steer the robot. Brush and vacuum motors 610 clean the floor, and can be operated in different modes, such as a higher power intensive cleaning mode or a normal power mode.

LIDAR module 616 includes a laser 620 and a detector 616. A turret motor 622 moves the laser and detector to detect objects up to 360 degrees around the cleaning robot. There are multiple rotations per second, such as about 5 rotations per second. Various sensors provide inputs to processor 604, such as a bump sensor 624 indicating contact with an object, proximity sensor 626 indicating closeness to an object, and accelerometer and tilt sensors 628, which indicate a drop-off (e.g., stairs) or a tilting of the cleaning robot (e.g., upon climbing over an obstacle). Examples of the usage of such sensors for navigation and other controls of the cleaning robot are set forth in U.S. Pat. No. 8,855,914, "Method and apparatus for traversing corners of a floored area with a robotic surface treatment apparatus," the disclosure of which is incorporated herein by reference. Other sensors may be included in other embodiments, such as a dirt sensor for detecting the amount of dirt being vacuumed, a motor current sensor for detecting when the motor is overloaded, such as due to being entangled in something, a floor sensor for detecting the type of floor, and an image sensor (camera) for providing images of the environment and objects.

A battery 614 provides power to the rest of the electronics though power connections (not shown). A battery charging circuit 612 provides charging current to battery 614 when the cleaning robot is docked with charging station 206 of FIG. 2. Input buttons 623 allow control of robot cleaner 602 directly, in conjunction with a display 630. Alternately, cleaning robot 602 may be controlled remotely, and send data to remote locations, through transceivers 632.

Through the Internet 636, and/or other network(s), the cleaning robot can be controlled, and can send information back to a remote user. A remote server 638 can provide commands, and can process data uploaded from the cleaning robot. A handheld smartphone or watch 640 can be operated by a user to send commands either directly to cleaning robot 602 (through Bluetooth, direct RF, a WiFi LAN, etc.) or can send commands through a connection to the internet 636. The commands could be sent to server 638 for further processing, then forwarded in modified form to cleaning robot 602 over the internet 636.

Computer Systems for Media Platform and Client System

Figure 7:
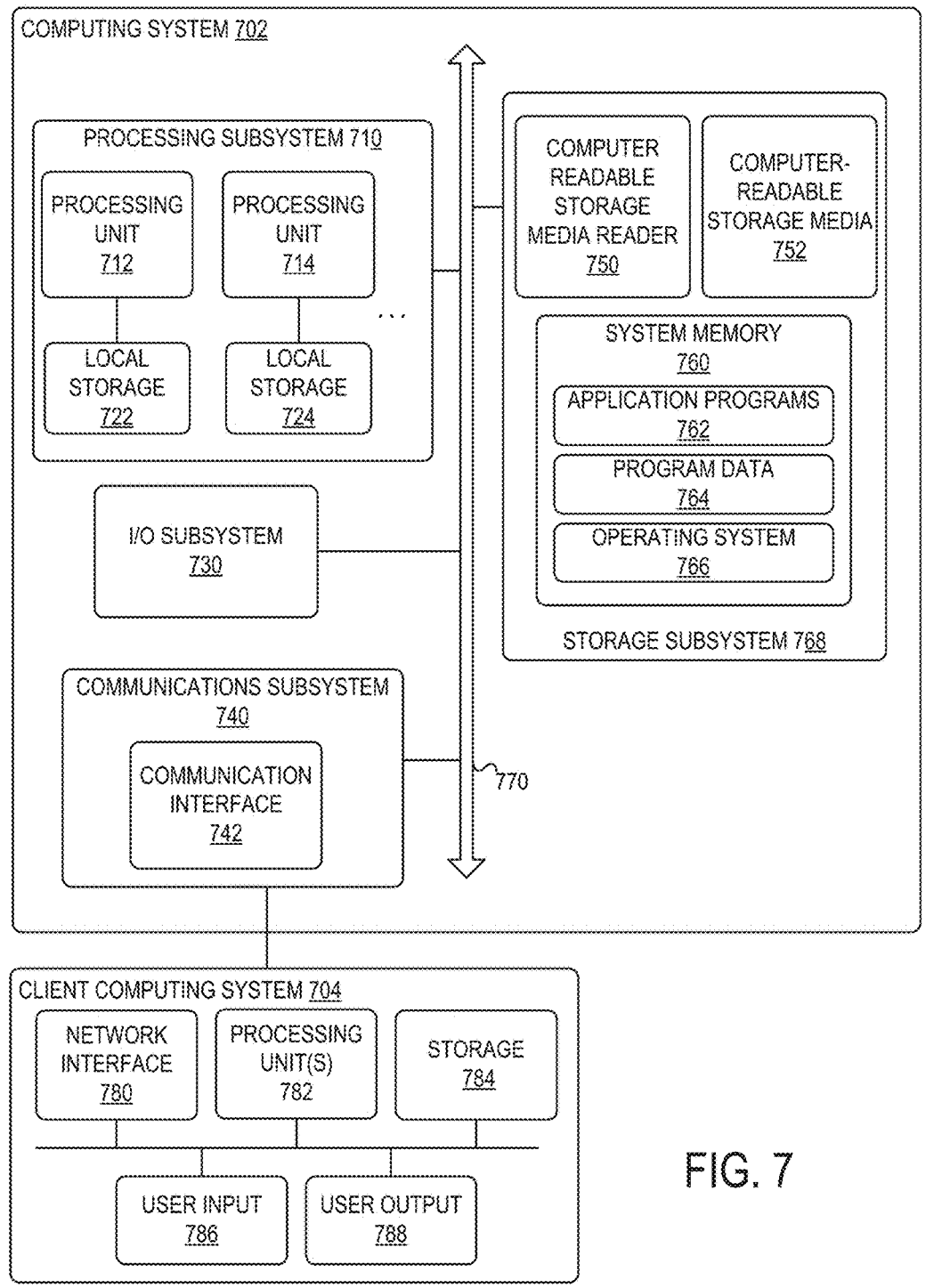
FIG. 7 is a simplified block diagram of a representative computing system and client computing system usable to implement certain embodiments of the present invention.

Various operations described herein may be implemented on computer systems. FIG. 7 shows a simplified block diagram of a representative computing system 702 and client computing system 704 usable to implement certain embodiments of the present invention. In various embodiments, computing system 702 or similar systems may implement the cleaning robot processor system, remote server, or any other computing system described herein or portions thereof. Client computing system 704 or similar systems may implement user devices such as a smartphone or watch with a robot cleaner application.

Computing system 702 may be one of various types, including processor and memory, a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 702. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of UPP system 102, or any other server(s) associated with UPP system 102. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present invention.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality described herein as being performed by a server or client, or other functionality associated with message management services.

It will be appreciated that computing system 702 and client computing system 704 are illustrative and that variations and modifications are possible. Computer systems used in connection with embodiments of the present invention may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present invention may be realized in a variety of apparatus including electronic devices implemented using any combination of circuitry and software.

Styles

Robots can be used for a variety of operations, using different robots or the same robot. For example, an indoor cleaning robot may have a vacuum and brush, but may also have sensors to map WiFi signal strength, measure air quality, measure temperature, etc. Not only may the different operations suggest different styles, but different people may have different preferences. For example, a particular user may override a default setting to collect WiFi data every 5 feet, and only collect it once for each room. In another example, a security circuit or sweep could be done with a camera, microphone or other sensors on the robot looking for unusual objects, activities, noises, open or broken doors, windows, movement, etc. For example, a quick reassurance check could be done, or a thorough check based on a loud noise being detected. In another example, the robot can have a search mode to look for lost objects (provided a camera on the robot, or objects equipped with RFIDs). This again could be a thorough mode or a time-limited mode (e.g., need keys in 5 minutes before leaving the house). Another example is different styles or modes of social functionality—playing hide and seek, taking pictures of pets while owners are on vacation, etc.

Robot vacuum cleaners are purchased by people who vary in their cleaning habits and requirements, to be used in vastly different environments. Therefore, the "one size fits all" approach to robot cleaning styles is far from optimal. To provide a better fit to users and their environments, personalization is provided through distinct autonomous cleaning styles. These styles differ along 3 fundamental dimensions: obstacle avoidance, thoroughness of coverage, and cleaning time, and can be achieved through adjustments to the autonomous robot navigation.

The distinct cleaning styles match needs and environments along the 3 fundamental dimensions of Coverage, Obstacle Avoidance, and Cleaning Time, which, taken together, constitute a unified framework for creating and further tuning the navigational cleaning styles.

In other embodiments, different styles and dimensions can be used. For example, only coverage and cleaning time dimensions may be used, and only fast or thorough styles may be offered. Other styles may be offered, such as an interactive style that stops at a questionable obstacle and provides an image over a wireless connection to the user's smartphone application. The user can then go pick up the object (e.g., a sock, marbles, etc.), or can indicate that the robot should avoid it or go over it (false obstacle detection).

Definition of 3-Dimensional Space of Robot Vacuum Navigational Cleaning Styles

Figure 8:
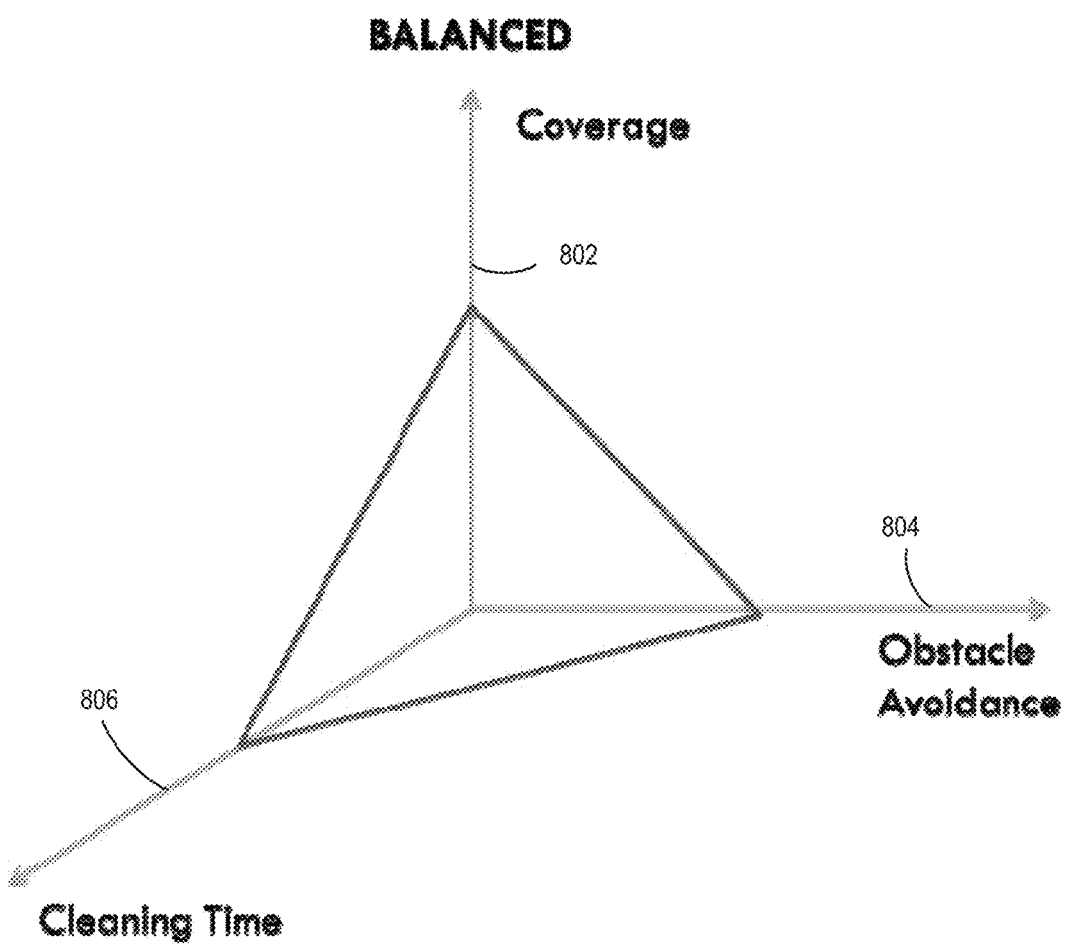
FIG. 8 is a graph illustrating an embodiment of a Balanced Style.

Based on the nature of its functionality, a robot cleaner system is categorized along the following fundamental dimensions as shown in FIG. 8, displaying a Balanced style:

Coverage (802) refers to how much of the reachable space the robot covers during cleaning. This refers to the area under the brush, pad, or other cleaning element, not just the robot's footprint.

Obstacle Avoidance (804) refers to the extent to which the robot succeeds to avoid the obstacles in its path, including walls. It minimizes colliding with or running over the obstacles. When it does collide with obstacles, it minimizes the impact of that collision.

Cleaning Time (806) refers to how long it takes a robot to complete a cleaning cycle. This refers to covering a desired area in its entirety, excluding the time it take to recharge the battery.

While ideally people would like their robot vacuum cleaners to clean their homes quickly, thoroughly, without damaging their furniture/walls, and without having to perform even the minimum amount of pre-cleaning (e.g., removing the socks or other small objects), this expectation is hardly realistic. Even the best human cleaners would fall short of this perfection, and would still have to find an optimal balance along the three aforementioned dimensions. Additionally, people's homes are as different as people are themselves, and the cleaning style that would be optimal for large, open spaces (e.g., fast) would be sub-optimal in small, cluttered places (which may need a gentle style).

To address this fundamental challenge, in one embodiment, distinct cleaning styles are provided which match user requirements and environments. These styles can be either chosen by the user, selected autonomously based on initial input from the user (e.g., based on survey responses regarding their cleaning preferences), or learned through deployment in user homes. At least four distinct styles are provided within this framework in one embodiment:

Balanced (see FIG. 8): gives equal weight to all 3 dimensions, with a "one size fits all" approach.

Figure 9A:
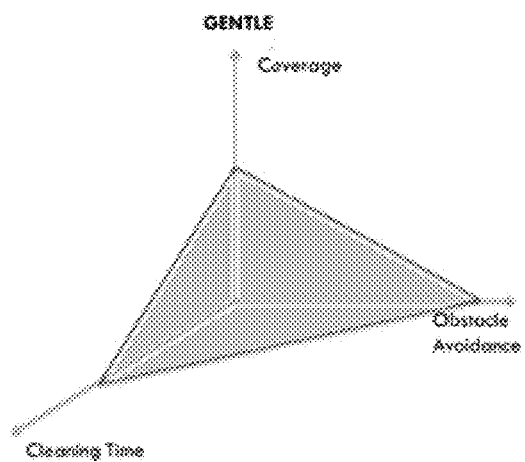
FIGS. 9A-C are graphs illustrating Cleaning Styles: Gentle, Fast and Thorough.

Gentle (FIG. 9A) maximizes Obstacle Avoidance at some expense of Coverage and Cleaning Time. This style is suitable for people with delicate furniture, where the importance of avoiding even minute furniture damage due to collision is paramount.

Figure 9B:
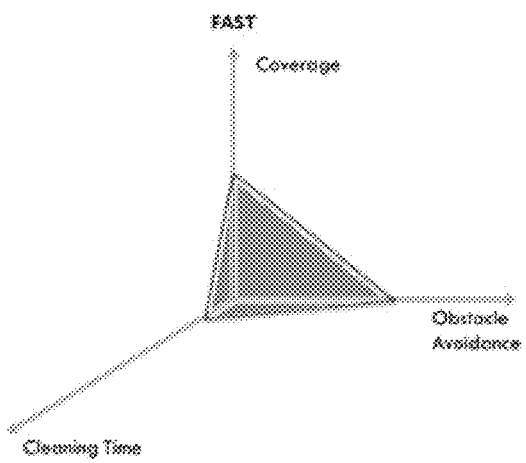

Fast (FIG. 9B) minimizes Cleaning Time while sacrificing Coverage and some Obstacle Avoidance. This style is suitable for high speed cleaning of largely open spaces, where the time it takes to clean is more important that thoroughness. It also emphasizes open areas free of obstacles, which may generally be more likely to have foot traffic and be dirtier than areas with lots of obstacles.

Figure 9C:
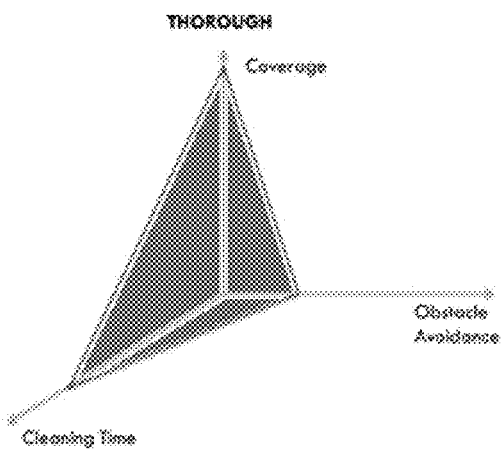

Thorough (FIG. 9C) maximizes Coverage while prolonging Cleaning Time and sacrificing Obstacle Avoidance. This style is suitable the most when people would like the robot to reach every nook and cranny and thoroughly remove all dirt, no matter how long it might take, or how close to obstacles the robot may have to go.

Other styles may pursue different objectives: for example, a thorough/gentle style which provides both thorough and gentle cleaning at the same time. All of the reachable areas can be covered, with the robot cleaner slowing to a crawl near obstacles to avoid collisions or to make them gentle.

These cleaning styles are implemented by making adjustments to the autonomous navigation system along the aforementioned dimensions: Obstacle Avoidance, Coverage, and Cleaning Time, fusing continuous navigation actions in a behavior-based manner. For each style, the way the robot navigates around the environment is strategically changed in reliance on the current and prior sensor data. A framework is provided within which a consistent behavior can be achieved through fusion of continuous actions in the entire navigational space.

Navigational Adjustment Categories for Robot Vacuum Navigational Cleaning Styles An autonomous robot navigation system may have a number of specific categories where navigational adjustments can be applied to achieve distinct cleaning styles within the aforementioned 3D space. In particular, a hybrid deliberative/reactive system combines planning and reactive components to smoothly achieve autonomous navigation in a variety of environments. An example of a deliberative/reactive system is described in Arkin, R. C. & Balch, T., "AuRA: Principles and Practice in Review", Journal of Experimental and Theoretical Artificial Intelligence, 1997. A number of navigational adjustments can be made along the 3 aforementioned dimensions to achieve the desired cleaning styles. Specific adjustment parameters and categories will vary from one autonomous navigation system to another; the examples below are more general, and would be applicable to a wide range of systems.

Coverage:

Designation of cleaned vs. uncleaned areas. If the robot marks an area as cleaned in a more conservative manner, such as by overlapping previously cleaned areas, then the probability of having uncleaned navigable areas at the end of the cleaning cycle is diminished.

Selection of areas to be cleaned. The planning system chooses an area to be cleaned based on a number of factors, for example, its size, proximity to obstacles, or its distance from the current robot location. To maximize coverage, even the smallest unclean areas could be selected to be cleaned.

Prescribed distance from the robot's surface to detected obstacles. The closer the robot is set to stay to obstacles, the higher the coverage that can be achieved, allowing more thorough cleaning in corners, along walls, and under/around chairs and other obstacles.

Number of times each area is to be cleaned. For a more thorough cleaning, either each area or particularly soiled areas are cleaned more than once. For example, the entire cleaning route could be followed twice. Alternately, particularly dirty areas can be identified using sensors or previous markings on a map from previous sensor readings or user input. Only those dirty areas might be addressed in a second pass. Alternately, the robot can simply slow down significantly over such dirty areas. A variety of sensors could be used, such as a laser sensor detecting the volume of dust particles being pulled up by a vacuum in different areas.

Goal persistence. This parameter sets forth how long the robot should try to reach a difficult to reach area, or how precise should goal completion be. E.g., instead of specifying an exact x, y coordinate to reach, the parameter specifies an area around it (+/−a certain amount).

Obstacle Avoidance:

Prescribed distance from the robot's surface to detected obstacles. Given sensor data uncertainty, the closer the robot is allowed to stay to any detected obstacles, the higher is the probability that a trajectory will result in a collision. Adhering to the proscribed distance can be achieved through a number of means:
  i) Planning a trajectory a certain distance from detected obstacles.
  ii) Reactively adjusting the trajectory upon approaching an obstacle.
  iii) "Inflating" the robot's perimeter to provide further insurance against sensor data uncertainty.

Designation as an obstacle. Due to sensor uncertainty, the probability of a detected obstacle being an obstacle to be avoided is usually assigned, and an obstacle can be marked as such based on this probability and the relative importance of obstacle avoidance. For example, to maximize obstacle avoidance, the system marks a detected possible obstacle as an obstacle using a low probability threshold. In addition, the area adjacent to a detected obstacle can be marked as part of an obstacle to be avoided.

In one embodiment, a camera is provided on the robot cleaner to capture images of obstacles. Those images can be correlated with the position of obstacles on a map developed from a laser or other sensor used to generate distance and mapping data. The images can be used to modify the probability that a detected obstacle is really an obstacle. Also, the images can be compared to known images of types of obstacles to classify them as delicate obstacles to be avoided, durable obstacles that can be bumped, or obstacles (e.g., a sock or string) that can jam a cleaning brush. The processing can be done locally in the robot cleaner, through communication with a program running on a local computer or portable device (e.g., smartphone), or at a server accessed over the Internet.

Robot's speed during different portions of the cleaning cycle. The robot is slowed down when the robot is closer to the obstacles to maximize obstacle avoidance, and overall speed is reduced to minimize the collision impact with an undetected obstacle. This also allows less accurate, and less expensive, sensors to be used for obstacle detection, allowing for the occasional error.

Selection of areas to be cleaned. To maximize obstacle avoidance, smaller areas, especially those surrounded by obstacles, may be skipped as unsuitable.

Trap recovery/escape. Shorter time-outs are used if the robot is trapped in difficult, unnavigable, or cluttered areas. This minimizes unnecessary prolonged proximity to obstacles, reducing the probability of collision.

Cleaning Time

Varying robot's speed.
  i) Speeding up uniformly for a fast clean.
  ii) Slowing down uniformly for a thorough clean, and slower yet for especially soiled areas, to allow better dirt pick-up.

Prescribed distance to detected obstacles. The robot is controlled to stay farther away from detected obstacles, favoring open spaces, to provide a quick cleaning.

Trap recovery/escape. Shorter time-outs are used during trap escape, potentially sacrificing coverage for a quicker cleaning. As can be seen, some of the same cleaning dimension selections overlap for different styles.

Other Operations

As noted above, robots can be used for a variety of operations, using different robots or the same robot. Examples include mapping WiFi signal strength, measuring air quality, measuring temperature, releasing air freshener (or applying an odor coverer over a soiled spot), releasing water vapor (humidifier), detecting water (to prevent dry rot issues), etc. A number of these operations, if combined with a cleaning robot, can be performed essentially the same regardless of the cleaning style selected. Others will be impacted, and can be taken into account by the user. For example, a fast cleaning style may miss small rooms for WiFi mapping or providing an air freshener. A hybrid style could be offered to optimize multiple functions. For example, a fast clean/WiFi style could modify the fast parameters so the robot goes into small rooms that would otherwise be skipped, but just go in briefly enough to take a WiFi measurement.

Methods for Selection and Personalization/Tuning Navigational Cleaning Styles

Once the styles are implemented, there are a number of methods by which they can be selected. Furthermore, these selections can be applied to the entire cleaning cycle, covering the entire environment to be cleaned, or by area/section/room, where it makes sense. The following methods can be used for selecting a navigational cleaning style:

Direct user selection. The style is selected directly by the user from a number of available styles in an on/off fashion. Such selection options may be provided either on the robot itself via a menu, or through means of a remote application connected to the robot wirelessly.

Automatic based on questionnaire. The style is automatically selected based on initial user preferences. For example, initially, the user is asked to fill out a questionnaire about his/her cleaning preferences and personality, and the robot selects the most appropriate cleaning style based on those entries. A default option (e.g., balanced) would be provided if the initial input is not received. For example, the questionnaire may ask the following (using a 7 point Likert scale):

To what extent do you agree with the following statements on a scale of 1-7, with 1 indicating strongly disagree and 7 indicating strongly agree.
Is cleaning speed more important than a thorough cleaning? 1 2 3 4 5 6 7
Are you a clean freak? 1 2 3 4 5 6 7
Do you have expensive or fragile furniture? 1 2 3 4 5 6 7

Adaptive learning from cleaning history. The style is selected by learning the most appropriate style based on cleaning history. For example, if the history shows excessive bumping into obstacles or a lot of clutter, then a gentle style could be either selected by the robot or recommended to the user. A fast style may be selected or recommended if the user is constantly stopping the cleaning before completion. This adaptive learning can select or recommend styles for the entire environment, or room by room.

Adaptive learning based on style selection history. The style is selected by learning the preferred cleaning style based on the history of user cleaning style selections. This is an example of preference learning, which can be done through a variety of different machine learning techniques. For example, if the user is selecting "thorough" style for certain areas of the house the majority of the time, this style could be set as default for those areas. Other considerations may be taken into account by the learning algorithm, such as time of day, schedule, etc. For example, the history may show the user selecting a thorough style on weekdays when the user is away from home at work, and a fast cleaning style on weekends when the user is home and does not want the robot running and making noise for a long time.

Additionally, depending on the set of navigation parameters available in the autonomous robot navigation system, it is possible to provide further personalization within each style, where the emphasis on each dimension can differ within a certain range. For example, in Gentle Clean style, the system may vary the distance to obstacles, up to a certain distance, beyond which the probability of collision would be too high. This could be adjusted either based on user preferences, or the environments the robot is used in.

In one embodiment, a selected style maps to a look-up table which provides parameters for navigation of the robot cleaner. Table 1 below is an example of such a look-up table:

TABLE 1

|  | GENTLE | FAST | THOROUGH | BALANCED |
|---|---|---|---|---|
| COVERAGE | | | | |
| Overlap (o) | o = 10% | o = 0% | o = 50% | o = 10% |
| Minimum areas to clean (a) | a > 3 sq. ft. | a > 5 sq. ft. | a = 1 sq. ft. | Only >4 sq. ft. areas |
| Minimum obstacles/sq. ft. to clean (oa) | oa = 2/5 (2 obstacles/5 sq. ft.) | oa = 1/5 (1 obstacle/5 sq. ft.) | oa = 10 (10 obstacles/sq. ft.) | <3 obstacles/5 sq. ft. |
| Buffer distance from robot to obstacle (bd) | bd = 2 in. from obstacles | bd = 3 in. from obstacles | bd = 0 in. from obstacles | bd = 1 in. from obstacles |
| Number of cleaning passes (p) | p = one | p = one | p = two | p = one |
| Suction power (sp) | sp = 70% | sp = 90% | sp = 100% | sp = 80% |
| Goal Persistence - time out in reaching obstacle blocked point - persistence time out (pto) | pto = 300 sec. | pto = 30 sec. | pto = 300 sec. | pto = 150 sec. |
| OBSTACLE AVOIDANCE | | | | |
| Areas to clean (a) | a > 3 sq. ft. | a > 5 sq. ft. areas | a > 0 | a > 4 sq. ft. areas |
| Minimum obstacles/sq. ft. to clean (oa) | oa = 2 obstacles/5 sq. ft. | oa = 1 obstacle/5 sq. ft. | oa = 10 (10 obstacles/sq. ft.) | oa = 3 obstacles/5 sq. ft. |
| Buffer distance from robot to obstacle (bd) | bd = 2 in. from obstacles | bd = 3 in. from obstacles | bd = 0 in. from obstacles | bd = 1 in. from obstacles |
| Overall speed (s) | s = 1/3 ft./sec. | s = 1 ft./sec. | s = 1/4 ft./sec. | s = 1/2 ft./sec. |
| Speed within 6 inches of obstacle (os) | os = 1/6 ft./sec. | os = 1 ft./sec. | os = 1/8 ft./sec. | os = 1/5 ft./sec. |
| Probability threshold to classify as obstacle detected (pt) | pt = 40% | pt = 40% | pt = 90% | pt = 60% |
| Trap recovery time-out (tto) | tto = 3 seconds | tto = 3 seconds | tto = 10 seconds | tto = 5 seconds |
| CLEANING TIME | | | | |
| Overall speed (s) | s = 1/3 ft./sec. | s = 1 ft./sec. | s = 1/4 ft./sec. | s = 1/2 ft./sec. |
| Buffer distance from robot to obstacle (bd) | bd = 2 in. from obstacles | bd = 3 in. from obstacles | bd = 0 in. from obstacles | bd = 1 in. from obstacles |
| Trap recovery time-out (tto) | 3 seconds | 3 seconds | 10 seconds | 5 seconds |

Figure 10:
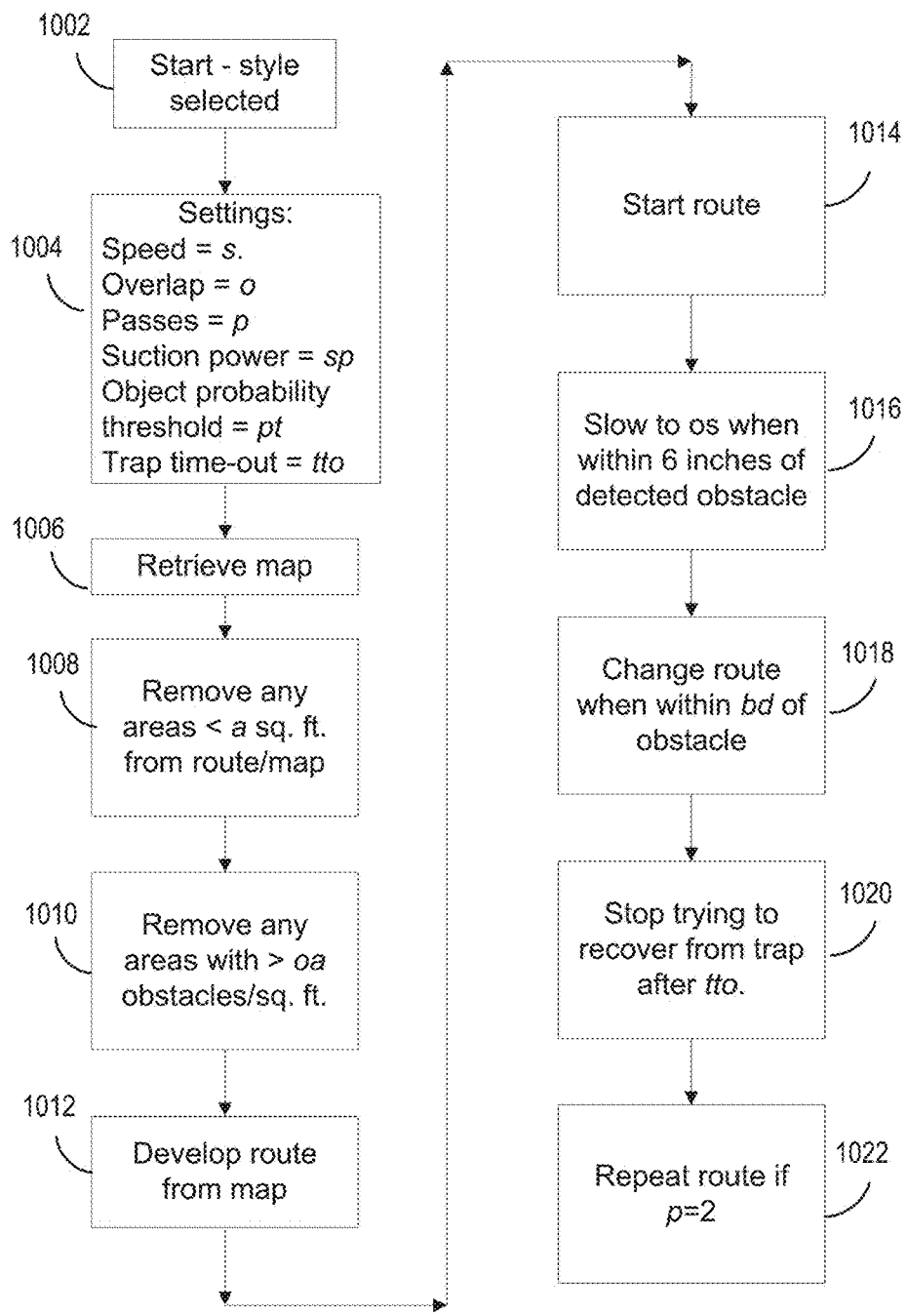
FIG. 10 provides an example embodiment of how the parameters in a look-up table are used to modify the navigational algorithm for a robot cleaner.

FIG. 10 provides an example embodiment of how the parameters in the above look-up table are used to modify the navigational algorithm for a robot cleaner. The process starts (1002) when the program receives a style selection. The parameters are then set (1004) based on the look-up table above:
Speed=s.
Overlap=o
Passes=p
Suction power=sp
Object probability threshold=pt
Trap time-out=tto The suction power is not set to 100% in all styles in one embodiment. For a fast clean, a high suction power may cause the robot cleaner to need to recharge before the mapped area is covered, for example. An adaptive algorithm can calculate whether the mapped fast style route can be accomplished on one charge, and can set the suction power accordingly. Thus, the suction power may be higher for small maps than for very large maps.

Where a brush is used, the brush speed may be set similarly to the suction power depending on the amount of battery power and the style selected. Also, a slower brush speed may cause fewer vibrations, and may be used when the robot cleaner is close to obstacles. If the cleaning robot has cleaning pads or mop-like attachments, the speed of those may be similarly varied. A pad that uses water and/or soap may dictate a further buffer from obstacles to avoid getting furniture wet.

If the environment has already been cleaned once, the map generated is retrieved (1006). If a map has not yet been generated, the steps that apply to the map are performed once the relevant portion of the map is generated. If the map already exists, it is examined, and any areas of the map less than a square feet are removed. As noted above, for a thorough cleaning, a=1 square foot (roughly the footprint of the robot cleaner) so that all areas will be cleaned. For a fast style cleaning, a=5 square feet, so that small areas are not cleaned in order to speed up the cleaning and focus on larger areas. If a map has not yet been generated, the limitation is not imposed until the size of an area is detected and mapped. A small area may be detected and mapped only after the robot cleaner has already cleaned half the area. In that case, for a fast clean, it may abandon cleaning the rest of the area and know to not enter the area on a subsequent cleaning.

The program will also remove from the cleaning map any areas with too many obstacles, for the style selected (1010). Thus, it will remove any areas that have greater than oa obstacles/sq. ft. Again, for a first pass with no map, this is done once the area is detected and mapped with the number of obstacles determined. An optimal route for the robot cleaner is then calculated (1012), and the robot cleaner starts on the route (1014).

The program will cause the robot cleaner to slow to os when within 6 inches of a detected obstacle (1016). The obstacle can be detected through a notation on the map, or in real time by the sensors, such as the laser sensor. The presence on the map may be confirmed using the real time sensing. The threshold for real time sensing to overrule the map indication may be set high for a thorough cleaning style, for example.

The program will cause the robot cleaner to change route when within bd of an obstacle (1018). Where a map already exists, with noted obstacles, this will be built into the planned map, and modified during the route based on the real-time detection of the obstacles location. Thus, even if the obstacle position is slightly off from the map, the general next step in the route should be set, so the robotic cleaner know in which direction to turn.

The program will cause the robot cleaner to stop trying to recover from trap after tto (1020). A trap is where there is little room to maneuver to get to an area to be cleaned. If the robot cleaner cannot get to a particular niche after trying several different approaches for tto time, it will back out or otherwise extricate itself from the area, and abandon trying to clean that niche.

The program will cause the robot cleaner to repeat the route for a second pass of cleaning if p=2, indicating a thorough cleaning style (1022).

CONCLUSION

While the invention has been described with respect to specific embodiments, one skilled in the art will recognize that numerous modifications are possible. Embodiments of the invention may be realized using a variety of computer systems and communication technologies including but not limited to specific examples described herein.

Embodiments of the present invention may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A mobile robotic system comprising:
   a housing;
   a drive motor mounted in the housing;
   a drive system, coupled to the drive motor, for moving a robotic apparatus;
   a processor;
   a distance and object detection sensor;
   a non-transitory computer readable media, coupled to the processor, containing instructions for:
   selecting a style from a plurality of styles responsive to an input command from a user,
   automatically selecting parameters for the style, determining a plurality of parameters for a plurality of dimensions of the style, and prioritizing one of the dimensions for the style over others of the dimensions for a plurality of the styles; wherein:

the styles include a gentle style, a fast style and a thorough style;

the dimensions include time, obstacle avoidance and coverage;

the gentle style prioritizing obstacle avoidance over time and coverage;

the fast style prioritizing time over coverage and obstacle avoidance; and the thorough style prioritizing coverage over time and obstacle avoidance.

2. The mobile robotic system of claim 1 further comprising a balanced style prioritizing all three dimensions substantially the same.

3. The mobile robotic system of claim 1 wherein the prioritization comprises adjustments to a table of parameters used for a robot navigation control program.

4. The mobile robotic system of claim 1 wherein the distance and object detection sensor comprises a laser, and further comprising:

a second non-transitory, computer readable media including instructions for performing a LIDAR algorithm.

5. The mobile robotic system of claim 1 wherein the distance and object detection sensor comprises a source providing collimated light output in an emitted light beam and a detector sensor operative to detect a reflected light beam from the emitted light beam incident on an object, and further comprising:

a rotating mount to which said source and said detector sensor are attached;

an angular orientation sensor operative to detect an angular orientation of the rotating mount;

a second non-transitory, computer readable media including instructions for computing distance between the rotating mount and the object, determining a direction of the stationary object relative to the robotic apparatus using the angular orientation of the rotating mount, and applying a simultaneous localization and mapping (SLAM) algorithm to the distance and the direction to determine a location of the robotic device and to map an operating environment.

6. The mobile robotic system of claim 1 further comprising:

a cleaning element mounted in the housing;

a cleaning element motor coupled to the cleaning element; and wherein the styles are cleaning styles and the dimensions are cleaning dimensions.

7. The mobile robotic system of claim 1, further comprising, an application, downloaded to a user device, including non-transitory computer readable media with instructions for prompting and responding to the input command from a user and for transmitting the input command to the processor; and a wireless receiver, mounted in the housing and coupled to the processor, for receiving the transmitted input command.

8. The mobile robotic system of claim 1 wherein the style is selected by one of (1) direct selection by the user of a certain style, (b) automatic selection based on initial input from the user via a questionnaire, (c) automatic selection and tuning based on an operational history of a particular environment, and (d) automatic selection learned from a history of user selections.

9. A mobile robotic system comprising:

a housing;

a drive motor mounted in the housing;

a drive system, coupled to the drive motor, for moving a robotic apparatus;

a cleaning element, mounted in the housing;

a processor;

a distance and object detection sensor comprising a source providing collimated light output in an emitted light beam and a detector sensor operative to detect a reflected light beam from the emitted light beam incident on an object, and further comprising:

a rotating mount to which said source and said detector sensor are attached;

an angular orientation sensor operative to detect an angular orientation of the rotating mount;

a first non-transitory, computer readable media including instructions for computing distance between the rotating mount and the object, determining a direction of the stationary object relative to the robotic device using the angular orientation of the rotating mount, and applying a simultaneous localization and mapping (SLAM) algorithm to the distance and the direction to determine a location of the robotic apparatus and to map an operating environment;

a second non-transitory computer readable media, coupled to the processor, containing instructions for:

selecting a cleaning style from a plurality of cleaning styles responsive to an input command from a user, automatically selecting parameters for the cleaning style, determining a plurality of parameters for a plurality of dimensions of the cleaning style, and prioritizing one of the cleaning dimensions for the cleaning style over others of the cleaning dimensions for a plurality of the cleaning styles; wherein:

the cleaning styles include a gentle style, a fast style, a thorough style and a balanced style;

the cleaning dimensions include cleaning time, obstacle avoidance and coverage;

the gentle style prioritizing obstacle avoidance over cleaning time and coverage;

the fast style prioritizing cleaning time over coverage and obstacle avoidance;

the thorough style prioritizing coverage over cleaning time and obstacle avoidance;

the balanced style prioritizing all three cleaning dimensions substantially the same;

wherein the prioritization comprises adjustments to a table of parameters used for a robot navigation control program;

an application, downloaded to a user device, including non-transitory computer readable media with instructions for prompting and responding to the input command from a user and for transmitting the input command to the processor; and a wireless receiver, mounted in the housing and coupled to the processor, for receiving the transmitted input command.

10. The mobile robotic system of claim 9 wherein the first and second non-transitory computer readable media comprise parts of a single physical media.

11. A method for controlling a mobile cleaning robot comprising:
   selecting a cleaning style from a plurality of cleaning styles responsive to an input command from a user,
   automatically selecting parameters for the cleaning style,
   determining a plurality of parameters for a plurality of dimensions of the cleaning style, and
   prioritizing one of the cleaning dimensions for the cleaning style over others of the cleaning dimensions for a plurality of the cleaning styles;
   wherein:
   the cleaning styles include a gentle style, a fast style and a thorough style;
   the cleaning dimensions include cleaning time, obstacle avoidance and coverage;
   the gentle style prioritizing obstacle avoidance over cleaning time and coverage;
   the fast style prioritizing cleaning time over coverage and obstacle avoidance; and
   the thorough style prioritizing coverage over cleaning time and obstacle avoidance.

12. The method of claim 11 further comprising a balanced style prioritizing all three cleaning dimensions substantially the same.

13. The method of claim 11 wherein the prioritization comprises adjustments to a table of parameters used for a robot navigation control program.

14. The method of claim 11 wherein the mobile cleaning robot includes a source providing collimated light output in an emitted light beam and a detector sensor operative to detect a reflected light beam from the emitted light beam incident on an object, a rotating mount to which said source and said detector sensor are attached, and an angular orientation sensor operative to detect an angular orientation of the rotating mount, the method further comprising:
   computing distance between the rotating mount and the object,
   determining a direction of the stationary object relative to the robotic device using the angular orientation of the rotating mount, and
   applying a simultaneous localization and mapping (SLAM) algorithm to the distance and the direction to determine a location of the robotic device and to map an operating environment.

15. A non-transitory computer readable media, coupled to a processor for controlling a robot, containing instructions for:
   selecting a style from a plurality of styles responsive to an input command from a user,
   automatically selecting parameters for the style,
   determining a plurality of parameters for a plurality of dimensions of the style, and
   prioritizing one of the dimensions for the style over others of the dimensions for a plurality of the styles;
   wherein:
   the styles include a gentle style, a fast style and a thorough style;
   the dimensions include time, obstacle avoidance and coverage;
   the gentle style prioritizing obstacle avoidance over time and coverage;
   the fast style prioritizing time over coverage and obstacle avoidance; and
   the thorough style prioritizing coverage over time and obstacle avoidance.

16. The non-transitory computer readable media of claim 15 further comprising a balanced style prioritizing all three dimensions substantially the same.

17. The non-transitory computer readable media of claim 15 wherein the prioritization comprises adjustments to a table of parameters used for a robot navigation control program.

* * * * *